US012664910B2

(12) United States Patent　　　(10) Patent No.:　US 12,664,910 B2
Warne et al.　　　　　　　　　　(45) Date of Patent:　　Jun. 23, 2026

(54) MOTION GENERATOR

(71) Applicant: Dynisma Ltd., Bristol (GB)

(72) Inventors: Ashley William Hawker Warne, Bristol (GB); Daniel Charmbury Ward, Bristol (GB); James Golding, Bristol (GB)

(73) Assignee: Dynisma Ltd., Bristol (GB)

(*) Notice:　Subject to any disclaimer, the term of this patent is extended or adjusted under 35 U.S.C. 154(b) by 443 days.

(21) Appl. No.:　18/564,977

(22) PCT Filed:　May 30, 2022

(86) PCT No.:　PCT/EP2022/025252
§ 371 (c)(1),
(2) Date:　Nov. 28, 2023

(87) PCT Pub. No.:　WO2022/253466
PCT Pub. Date: Dec. 8, 2022

(65)　　　　　Prior Publication Data
US 2024/0359315 A1　　Oct. 31, 2024

(30)　　　Foreign Application Priority Data

May 31, 2021　(EP) ...................................... 21020284
Jun. 7, 2021　(GB) ...................................... 2108102

(51) Int. Cl.
*B25J 9/00*　　　　(2006.01)
*G09B 9/12*　　　　(2006.01)
(52) U.S. Cl.
CPC ...................................... *G09B 9/12* (2013.01)
(58) Field of Classification Search
CPC . G09B 9/12; G09B 5/02; G09B 9/301; G09B 19/165; G09B 19/167
(Continued)

(56)　　　　　References Cited

U.S. PATENT DOCUMENTS 5,919,045 A　　7/1999　Tagge et al.
10,080,672 B2 *　9/2018　Casler ................... B62D 57/032
(Continued)

FOREIGN PATENT DOCUMENTS

CN　　207448460 U　*　6/2018
EP　　2486558 B1　　8/2013
(Continued)

OTHER PUBLICATIONS

International Search Report and Written Opinion for International Application No. PCT/EP2022/025252, dated Sep. 12, 2022, (15 pages), European Patent Office, Rijswijk, Netherlands.
(Continued)

*Primary Examiner* — Michael A Cuff
(74) *Attorney, Agent, or Firm* — Nath, Goldberg & Meyer; Joshua B. Goldberg

(57)　　　　　ABSTRACT

According to a first aspect of the invention there is provided a motion generator comprising an effector for applying forces, moments and movements to an effector pay load relative to a surface connected to one or more elongate rigid struts, each strut being connected at one end thereof by a first joint to the effector and being connected at its other end by a second joint to an associated rocker, the rocker comprising a rocker arm and having a pivot axis which is generally parallel with the surface, such that the movement of the rocker arm through a generally vertical are about the pivot axis leads to movement of the effector, and forces applied to an associated rocker lead to forces being applied to the effector, in which the movement of a rocker and forces applied by the rocker are controlled by an actuator, the actuator being in the form of, or comprising an elongate belt, cable, or rope drive which is connected by either end thereof to an associated rocker to apply a force to a point on the associated rocker away from the pivot axis of the rocker, the
(Continued)

motion generator further comprising means for applying tension to the belt, cable or rope drive during movement of an associated rocker.

20 Claims, 12 Drawing Sheets

(58) Field of Classification Search
USPC ........................................................ 463/36
See application file for complete search history.

(56) References Cited

U.S. PATENT DOCUMENTS

| | | | | |
|---|---|---|---|---|
| 2009/0207250 | A1* | 8/2009 | Bennett | ............... H04N 23/695 |
| | | | | 348/E5.025 |
| 2014/0157916 | A1 | 6/2014 | Vatcher et al. | |
| 2017/0053548 | A1 | 2/2017 | Warne | |
| 2020/0293112 | A1* | 9/2020 | Richter | ............... G09B 21/004 |
| 2021/0178604 | A1* | 6/2021 | Saunders | ................ B25J 5/007 |

FOREIGN PATENT DOCUMENTS

| | | | | | |
|---|---|---|---|---|---|
| EP | | 2810268 | A1 | 12/2014 | |
| EP | | 3081523 | A1 * | 10/2016 | .............. B66C 1/10 |
| EP | | 3739558 | A1 | 11/2020 | |
| JP | | 2000210831 | A | 8/2000 | |
| WO | WO-2020/228992 | A1 | 11/2020 | |
| WO | WO-2020/249262 | A1 | 12/2020 | |

OTHER PUBLICATIONS

Lucas, Guillaume et al. "Study of Latency Gap Corrections In A Dynamic Driving Stimulator," In: Driving Simulation Conference & Exhibition, (2 pages) Sep. 4, 2019, France, DSC 3019 Europe VR—(Year: 2019).

* cited by examiner

MOTION GENERATOR

CROSS REFERENCE TO RELATED APPLICATIONS

This application is a National Stage Application, filed under 35 U.S.C. § 371, of International Application No. PCT/EP2022/025252, filed May 30, 2022, which international application claims priority to and the benefit of United Kingdom Application No. 2108102.1, filed Jun. 7, 2021, and European Application No. 21020284.2, filed May 31, 2021; the contents of both of which are hereby incorporated by reference in their entirety.

DETAILED DESCRIPTION OF VARIOUS EMBODIMENTS

Field of Invention

This invention relates to the field of motion systems especially for simulating motion such as driving or flying. In particular, though not exclusively, the invention relates to motion generators, and to motion systems including such motion generators, and to methods of using motion generators, and motion systems for example for use as driving simulators, and to methods for their production.

Background

A motion generator is a device capable of applying movements, forces, and accelerations to a payload in one or more directions or degrees of freedom. The payload can be, for example, a human undergoing a simulated experience in a motion simulator incorporating a motion generator. Alternatively, the payload may also be a further motion generator which is said to be in series with the first motion generator. Motion generators are used in motion systems. Motion systems, in the context of this invention, include a control system for controlling the motion generator.

Motion systems are used in motion simulators. Motion systems are used in a variety of applications, including motion simulation (for example, flight simulators, vehicle and driving simulators), robotics, 3D printing, vibration, and seismic simulation. The most common type of motion generator currently used in motion simulation is the Stewart platform (or "hexapod") motion generator. This is a type of parallel manipulator that has six actuators, normally attached in pairs to three positions on the base of the manipulator and crossing over to three mounting points on a platform, or top plate (or "end effector"). Devices or payloads such as a human user placed on the platform, usually in some form of cockpit, driver area, or model vehicle, can be moved in the six degrees of freedom in which it is possible for a freely suspended body to move, i.e., the three linear movements x, y, z (lateral, longitudinal and vertical), and the three rotations (pitch, roll and yaw). Generally speaking, in a parallel manipulator-based motion system, several computer-controlled actuators are arranged to operate in parallel to support the payload. In this context "parallel" means that only one actuator exists in each separate load path between the payload and the base, whereas, in a series manipulator, one or more of the possible load paths between the payload and the base includes at least two actuators.

A motion simulator is a simulation system incorporating at least one motion generator/motion system that can create, for an occupant, the effects, or feelings of being in a moving vehicle. Motion simulators are used, professionally, for training drivers and pilots in the form of driving simulators and flight simulators, respectively. They also are used, industrially, in the creation, design, and testing of the vehicles themselves, as well as in the design of vehicle components. Professional motion simulators used for driving and flying simulation typically synchronise a visual display-provided, for example, by a projection system and associated screens and audio signals with the movement of a carriage (or chassis) occupied by the driver or pilot to provide a better sensation of the effect of moving. The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience. The payload of a motion generator used in motion simulation—for example, a chassis or cockpit—is relatively heavy often being of the order of 100's of kg, although smaller payloads are possible in certain applications such as gaming. Motion simulation applications for motion generators require the precise control of such relatively heavy payloads over significant movements, often being of the order of 1 metre or more.

The type of hexapods typically used for motion simulation for human participants typically have a relatively low bandwidth of up to about 20 Hz. This means that they can create oscillatory movements and vibrations of a consistent amplitude, with a frequency of up to 20 times per second, beyond which the amplitude of the movements reduces as the frequency increases. This may be sufficient for replicating most car suspension movements, but it does not transmit the frequency content such as that associated with vibrations from the car engine, tyre vibrations, road noise, and the sharp-edged kerbs on racetracks. A low bandwidth also means the signals are delayed, meaning that the driver cannot respond as quickly.

Current motion systems, especially those intended for high-end use such as in military and commercial flight instruction and training applications, are typically very large, heavy, complex, and very expensive. Their complexity necessitates extensive programming and maintenance, further increasing the cost to users.

Dedicated driving simulator motion systems have been developed by the likes of McLaren/MTS Williams/ABD and Ansible, but these tend to be extremely mechanically complex, and therefore expensive, featuring precision machined custom components and often expensive linear motors. These dedicated driving simulator motion systems are more responsive than hexapods when moving in some directions but are still limited in other directions. The common usage of ball screws in such systems is disadvantageous in that, whilst good at establishing position, they inhibit force transfer and can only achieve a lower bandwidth. These issues result in a less natural motion simulation experience for a human user. For example, they lead to poor system latency which requires additional correction measures to minimise motion sickness (see e.g., Lucas, G et al.—Study of latency gap corrections in a dynamic driving simulator—In: Driving Simulation Conference & Exhibition, France, 2019 Sep. 4-DSC 2019 EUROPE VR-2019).

The motion simulator disclosed in EP2486558, comprises a mechanism that uses a three degree of freedom parallel manipulator comprising three upright arms driven by bell cranks to control movement in pitch, heave, and roll, and therefore is responsive and has high bandwidth in those degrees of freedom. A rotary table driven in rotation by a linear actuator is required to provide yaw. The motion simulator is intended to be relatively compact. However, its horizontal degrees of freedom are provided by series manipulators which introduce compliance, inertia, and friction which limits the responsiveness and bandwidth of the system in the horizontal degrees of freedom.

U.S. Pat. No. 5,919,045 discloses an interactive racing car simulator, including a primary motion generator comprising a simple series arrangement of overlaying rectangular frames arranged to move in the X and Y directions respectively on linear guides under pneumatic control and termed the "X and Y frames". Whilst the simple arrangement of X and Y frames of the type disclosed in this document provides good excursions in the X and Y directions, as the frames are stacked above each other, the series motion generator is not especially compact in the vertical dimension. Furthermore, the movements in the X and Y directions are not especially precise, and also the simulator would have a relatively low bandwidth.

An example of a primary motion generator in a combination for use in a driving simulator is given in EP2810268A which discloses a three degree of freedom motion generator arranged in series with a six degrees of freedom motion generator which can sustain large movements in the horizontal plane using the primary motion generator, while simultaneously achieving the maximum vertical travel of the secondary motion generator. Therefore, the two motion generators working in series can achieve combinations of movements in different degrees of freedom which are impossible with a similarly sized hexapod. However, the hexapod described in this document uses linear actuators, specifically recirculating ball screw-driven linear actuators. As noted above, recirculating ball screw actuators have considerable friction, and so lead to poor responsiveness and bandwidth. The use of other linear actuators in a hexapod architecture leads to further problems. In the case that the linear actuator is mobile as part of the moving strut then it has high moving mass which leads to mechanical resonance at low frequencies, limiting system responsiveness and bandwidth. Alternatively, in the case that the linear actuator is fixed relative to a base, and one end of the hexapod strut translates along the linear actuator, then the weight and inertial loads of the system are reacted by a linear bearing which again involves considerable friction.

US2017/0053548A discloses a motion system including a cable/actuator-controlled platform which is slidable on a large low friction fixed base, and which allows for significant horizontal movement of the platform. The cables and actuators are disposed around the periphery of the large base, allowing the significant horizontal movement of the platform in this design. A hexapod-based secondary motion generator is in turn mounted on the platform and supports a model vehicle cockpit in order to provide further movement of the cockpit. The motion system is not compact for the excursion levels provided by the large low friction fixed base design.

Applicant's WO2020/228992 (also published as EP3739558) discloses a rocker-based motion generator in which at least one rocker's pivot axis is inclined, and in a preferred configuration, all rockers' pivot axes are perpendicular to a reference surface. US2014/157916 (DYNAMIC MOTION SYSTEMS GMBH) discloses a motion simulation system including a series of actuators each having a planetary gearbox driven by an associated servomotor which engages with a crank. This direct drive system is a high friction, high latency arrangement intended for use in applications such as amusement parks (see FIG. 17A to 17G). Although no data are provided, the arrangement of US2014/157916 would be expected to have a relatively low bandwidth and high latency. As such, it would not be suitable for driving simulation or games apparatus in which high bandwidth and low latency are desirable.

An object of the present invention is to provide an improved motion generator, especially one which is useful for driving and vehicle motion-type simulation applications, or applications involving lighter payloads, and improved motion systems incorporating such motion generators, which are again especially suitable for those applications.

A further object of the invention is to provide a motion generator also having good excursion characteristics in the horizontal, and vertical degrees of freedom.

SUMMARY OF THE INVENTION

According to a first aspect of the invention there is provided a motion generator for applying forces, moments and movements to an effector of the motion generator or a payload of the effector, the effector being disposed, arranged or positioned relative to a surface, the effector being connected to one or more elongate rigid struts, each strut being connected at one end thereof by a first joint to the effector and being connected at its other end by a second joint to an associated rocker (i.e., the rocker to which a particular strut is connected), each rocker comprising a rocker arm and having a rocker pivot axis which is generally parallel with the surface, such that the movement of a rocker about the pivot axis leads to movement of the effector, and forces applied to a rocker lead to forces being applied to the effector, in which the movement of a rocker and forces applied by the rocker are controlled by an actuator, the actuator being in the form of, or comprising, an elongate belt, cable, or rope drive which is connected by either end thereof to an associated rocker to apply a force to a point on the associated rocker away from the pivot axis of the rocker, the motion generator further including means for applying tension to the associated elongate belt, cable, or rope drive to maintain tension in the belt, cable, or rope drive during the motion of the associated rocker.

The pivot axis of the or each rocker is preferably horizontal, i.e., parallel with the surface. The rocker(s) preferably move in a generally vertical plane i.e., through a generally vertical arc.

It has been found that such a motion generator in accordance with the invention, has surprisingly good horizontal and vertical excursion characteristics whilst having a relatively compact footprint. For example, a motion generator in accordance with the invention may have an increase in excursion of 60% to 100% greater than a comparable motion generator (i.e., one with a similar chassis arm radius, as defined below) but having horizontally moving rocker arms i.e., with a vertical pivot axis. This represents a significant improvement in horizontal or vertical excursion characteristics for applications such as driving simulation.

The surface may be generally planar, and typically is planar. For example, in many applications the surface may simply be the floor of a building in which the motion generator according to the invention is installed, but it could be a relatively planar baseplate/base for the motion generator. An expensive highly planar surface is not required. In other situations, such as the combinations described below and where the secondary motion generator is a motion generator in accordance with the invention, the surface may be a reference plane above the physical surface on which the combination is installed, typically provided by, or defined by the primary motion generator and that surface may move with the primary motion generator.

In this context, a rocker conventionally means a solid body (which may also be referred to as a rocker arm) being attached to one end of an elongate revolute joint, or pivot, the body being able to rotate about a pivot axis provided by this joint, or pivot, thereby rotating relative to another solid body attached to the other end of the joint, or pivot. The rocker will typically also have other joints and pickup points on its body, attached to other moving elements. Rockers are typically used in mechanical systems to control relative motions of moving elements, controlling mechanical advantages, and to change directions of motion. Mechanical elements such as bell cranks and levers are forms of rockers. Rockers are often used, for example, in car suspension e.g., in pushrod or pull-rod suspension arrangements. The term "rocker" also embraces for the purposes of this disclosure, a solid body attached to or integral with a flexure, such that the body is able to describe an arc about an imaginary axis, that imaginary axis being equivalent to a pivot axis as referred to above for other rockers.

Thus, the invention provides a motion generator in the form of a parallel manipulator with one, two, three, four, five or preferably six degrees of freedom comprising one, or more, typically six, actuators each capable of producing responsive and high bandwidth movements. In a motion generator according to the invention, the effector may typically be connected to four or more elongate rigid struts, more typically six such struts. The motion generators of this invention are therefore able to provide responsive and high bandwidth motion in all six degrees of freedom with particularly good excursions in horizontal and vertical dimensions for the relative size of the motion generator footprint.

A motion generator in accordance with the invention may be advantageous in some or all of several respects compared with known motion generators. In addition to the good levels of excursion in the horizontal and vertical degrees of freedom, it may also have low levels of friction within its moving parts. The motion generator design of the invention minimises friction, and therefore is responsive and has high bandwidth because the weight and loads imparted upon the payload are reacted by a rocker (typically along with its rotary bearings at the pivot point) which has less friction than the linear bearings or linear guides used in conventional designs. In other words, the rocker provides a low friction guide which contributes to the responsiveness of the motion generator. Additionally, the actuator motor directly connects to the belt or similar drive via a short length of the belt or other similar drive to the rocker. Furthermore, the struts advantageously directly interconnect the end effector and the associated rocker by means of the upper and lower joints which also contributes to the responsiveness of the motion generator. The motion generator may have low inertia due to the lower mass of moving elements compared with known designs. Accordingly, it will have low latency in motion simulation applications such as driving simulation. The latency of the motion generator may typically be about 3-4 ms but may be less than about 3 ms. It may also have high bandwidth typically better than 50 Hz, in more than one degree of freedom. In some embodiments it may have significantly higher bandwidth than 50 Hz in multiple degrees of freedom, for example 80 Hz, 90 Hz, or 100 Hz or more which is a significant advance over comparable motion generator designs. Furthermore, it does not require the precision-machined metal base required, for example, by the sliding elements of motion generator of EP2810268A as it may be installed on a conventional building floor.

The excursion of the motion generator in the six degrees of freedom may be improved by choosing a favourable motion ratio. The motion ratio is a property of the system geometry that refers to the ratio of movement of the end effector in each direction relative to the movement of each of the actuator motors. The system geometry may be designed to achieve a large range of motion of the end effector within the achievable travel of the rocker and actuator motor i.e., to have a favourable motion ratio.

The motion ratio may vary across the motion generator excursion, and the system geometry may be designed to maintain a motion ratio which does not vary significantly across the travel. At the extreme, a motion ratio that reaches zero within the system travel is problematic because the corresponding actuator motor has no control over the motion of the end effector, which may cause the end effector to topple over.

The excursion is bounded by a six-dimensional envelope, which is ideally chosen to be large in some or all of the degrees of freedom, and convex. A hypersphere is an example of an envelope which is convex across its whole surface and a convex envelope is beneficial because the system may move in a straight line from any point in its usable travel to any other point in its usable travel without exiting the envelope.

The first and second joints in a motion generator of the invention, i.e., the upper and lower joints may together have a total number of degrees of freedom which is at least five. Preferably, one of the first or second joints may include a universal, cardan, spherical joint, or flexure, while the other may be a spherical joint. The stiffness of such joints typically reduces as their required range of motion increases. The system geometry and the orientation and position of the first and second joints may be improved to minimise the range of motion of each joint within the system excursion. For these reasons cardan joints are preferred.

A motion generator in accordance with the invention typically comprises a plurality of rockers. In most arrangements, the motion generator may comprise six rockers. The pivot axis of at least one, preferably each, rocker is fixed to pivot about a pivot axis generally parallel relative to the surface where the surface is a physical surface on which the motion generator is installed i.e., the pivot axis is in a horizontal plane. Each pivot axis may be parallel with the surface. Alternatively, (typically in the context of a combination including a motion generator in accordance with the invention mounted as a secondary motion generator on a primary motion generator), the pivot axis of the rocker may not be fixed relative to that surface but is fixed generally parallel relative to a plane above the physical surface, that plane moving with the primary motion generator. The rocker pivot is preferably a revolute joint, an axle with bearings, or a flexure. Each rocker may move I.e., rotate or pivot in a plane which is perpendicular to the surface. Preferably both, the actuator and the rocker (specifically the "free" end of the rocker which describes an arc of movement) move coaxially with the longitudinal axis of the associated elongate rigid strut. In other words, the actuator and rocker are aligned with the strut which improves the efficiency of the rocker/strut connection and the transfer of force from the actuator to the effector. More specifically, preferably both of, the actuator and the rocker are arranged parallel with or in line with the longitudinal axis of the associated elongate rigid strut when the actuator and/or rocker are in a nominal condition i.e., when the motion generator is in a nominal condition.

Advantageously, the belt, cable or rope may move parallel, preferably in line with the longitudinal axis of the strut. In this way less bending load is taken by the associated rocker, and the load is more directly transmitted to the belt, cable or rope and associated motor. These factors increase the responsiveness of the motion generator.

A motion generator according to the invention may typically comprise 4, 5, 6 or more elongate struts, but motion generators with 1, 2 or 3 elongate struts are also contemplated. For example, the motion generator may comprise X elongate struts, where X is less than six and at least one mechanical constraint means which constrains Y degrees of freedom of the effector where Y=6-X. Alternatively there could be more than 6 elongate struts. Pairs of elongate struts may be arranged on opposing sides of the end effector. In one typical embodiment, a motion generator comprises three pairs of elongate struts.

At least one actuator may be arranged so that it can react the load back to the surface. Belt, cable, or rope drive actuators may be advantageous in that they are relatively less expensive. Where the motion generator is powered by an actuator such as an elongate belt, cable or rope drive, the elongate belt, cable, or rope drive may be actuated by a pulley or capstan. Such a pulley or capstan may be driven by an electric motor or gearmotor.

Both the ends of the belt, cable or rope drive are attached to an associated rocker, thus effectively forming a closed loop in the belt, cable, or rope drive between two attachment points on the rocker. Alternatively, the belt or similar drive may be in the form of a closed loop which is suitably fixed to the associated rocker. A passive tensioning device, for example one including a pulley, may be applied to one end of, or portion of, the belt, cable, or rope drive to maintain tension in the belt, cable, or rope drive and to accommodate its fixed length within the changing geometry of the system. The passive tensioning device may accommodate a change in geometry of the rocker. The passive tensioning device could include a spring on a linear guide, or the linear guide could be replaced by another rocker/lever. Alternatively, a linear spring in a passive tensioning device could be replaced with a torsion spring. One or more passive force application devices may be connected to a rocker so as to provide assistance to the actuator such as static preload or damping, or to support the weight of the payload so as to tend to maintain it in a neutral state (or "condition"). This assistance could be provided by a passive force application device such as a spring, gas strut or bungee.

At least one rocker and/or actuator may be mounted on or to the surface. Alternatively, or additionally, at least one rocker and/or actuator may be mounted on a frame or other support fixed to the surface.

The payload supported by the effector may be more than 10 kg, preferably more than 80 kg, preferably more than 250 kg, or even more than 500 kg. Typically, in motion simulation applications, the payload may be a vehicle chassis or cockpit or a model thereof.

A motion generator according to the invention may be arranged to operate as a secondary motion generator in series with a primary motion generator. Such a combination arrangement comprising a primary and secondary motion generator, may provide a user with a greater range of motion for a payload. For example, the combination may achieve excursions of the order of 1 metre required in motion simulation, especially vehicle motion simulation, applications. Furthermore, such a combination arrangement may permit the use of a relatively simple, and therefore cost-effective, primary motion generator providing motion for example in the X and Y directions only with the secondary motion generator providing more complex motions. Alternatively, the primary motion generator could have X, Y, and yaw degrees of freedom. One example of a known motion generator suitable for use as a primary motion generator, with a motion generator in accordance with the invention as a secondary motion generator is that disclosed in US2017/0053548. In such a combination, a motion generator according to the invention is arranged as a secondary motion generator in which at least one rocker and or actuator of that generator is mounted on a frame, the end effector of, or as the payload of, the primary motion generator. For example, the primary motion generator may include a frame, or platform, as the end effector and at least one rocker of the secondary motion generator may be pivotally mounted to the frame of the primary motion generator.

According to another aspect of the invention there is provided a motion system, the motion system comprising at least one motion generator according to the invention, and a control system. The control system may control the operation of at least one motion generator actuator, preferably that of all actuators. The control system may compute the positions, accelerations and/or forces required to be produced at each actuator in order to generate a demanded motion profile.

According to another aspect of the invention there is provided a driving or vehicle simulator including a motion generator according to the invention or a motion system according to the invention, and at least one environment simulation means selected from visual projection, or display means, and audio means. The driving or vehicle simulator may comprise a cockpit or chassis and/or vehicle simulation element. The driving or vehicle simulator may include means for simulating an environment comprising at least one of a display apparatus, virtual reality apparatus, projection apparatus, and software means for modelling a virtual environment, and a vehicle model.

Another aspect of the invention provides a method of producing a motion system comprising producing or providing a motion generator according to the invention and connecting a control system to the motion generator to produce a motion system.

Other features of the motion generators, motion systems, and driving simulators will be apparent from the description and further claims set out herein. Where reference is made to apparatus such as motion generators, motion systems, motion simulators and certain aspects or embodiments of the invention, the skilled addressee will appreciate that other aspects and embodiments of the invention may equally apply to such apparatus.

A motion generator comprising a single rocker and associated elongate belt, cable or rope drive and strut is also contemplated for certain applications. Specifically, such a motion generator comprises an effector for applying forces, moments and movements to an effector and/or effector payload relative to a surface, the effector being connected to an elongate rigid strut, the elongate rigid strut being connected at one end thereof by a first joint to the effector and being connected at its other end by a second joint to an associated rocker, the rocker having a pivot axis which is generally parallel with the surface, and preferably parallel with the surface, such that the general vertical movement of the rocker through a generally vertical arc about the pivot axis leads to movement of the effector, and forces applied to the rocker leads to forces being applied to the effector, in which the movement of the rocker and forces applied by the rocker are controlled by an actuator, the actuator being in the form of, or comprising, an elongate belt, cable, or rope drive arranged to apply a force to a point on the rocker away from the pivot axis of the rocker, the motion generator further comprising tensioning means for tensioning the elongate belt, cable, or rope drive. The skilled addressee will appreciate that other features of this motion generator, such as the preferred alignment of the belt or other drive, rocker, with the longitudinal axis of the strut, or a portion of the belt or other drive passing through the rocker, may be taken from the motion generator.

BRIEF DESCRIPTION OF THE DRAWINGS

Motion generators, motion systems, and driving simulators and their operation and production in accordance with the invention will now be described, by way of example only, with reference to the accompanying drawings, FIGS. 1 to 10, in which.

References in this specification to particular orientations and positions, such as upper or lower, refer to those orientations or positions as shown in the accompanying drawings.

DESCRIPTION

A Motion Generator

Figure 7:
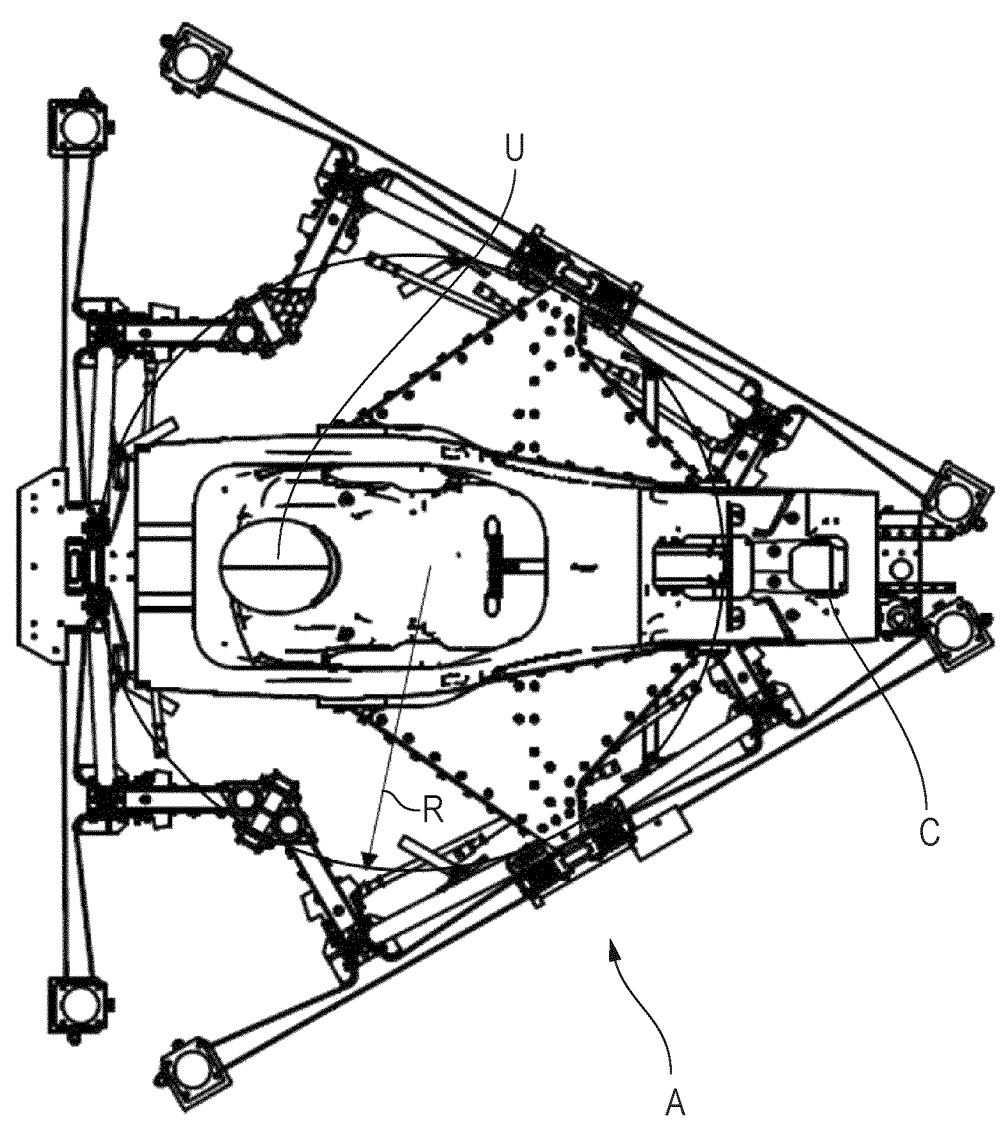
FIG. 7 is a plan view of a comparable motion generator having rockers with vertical pivot axes, and supporting a chassis payload, used in the modelling experiments having the results represented in FIGS. 5 and 6.
Figure 8:
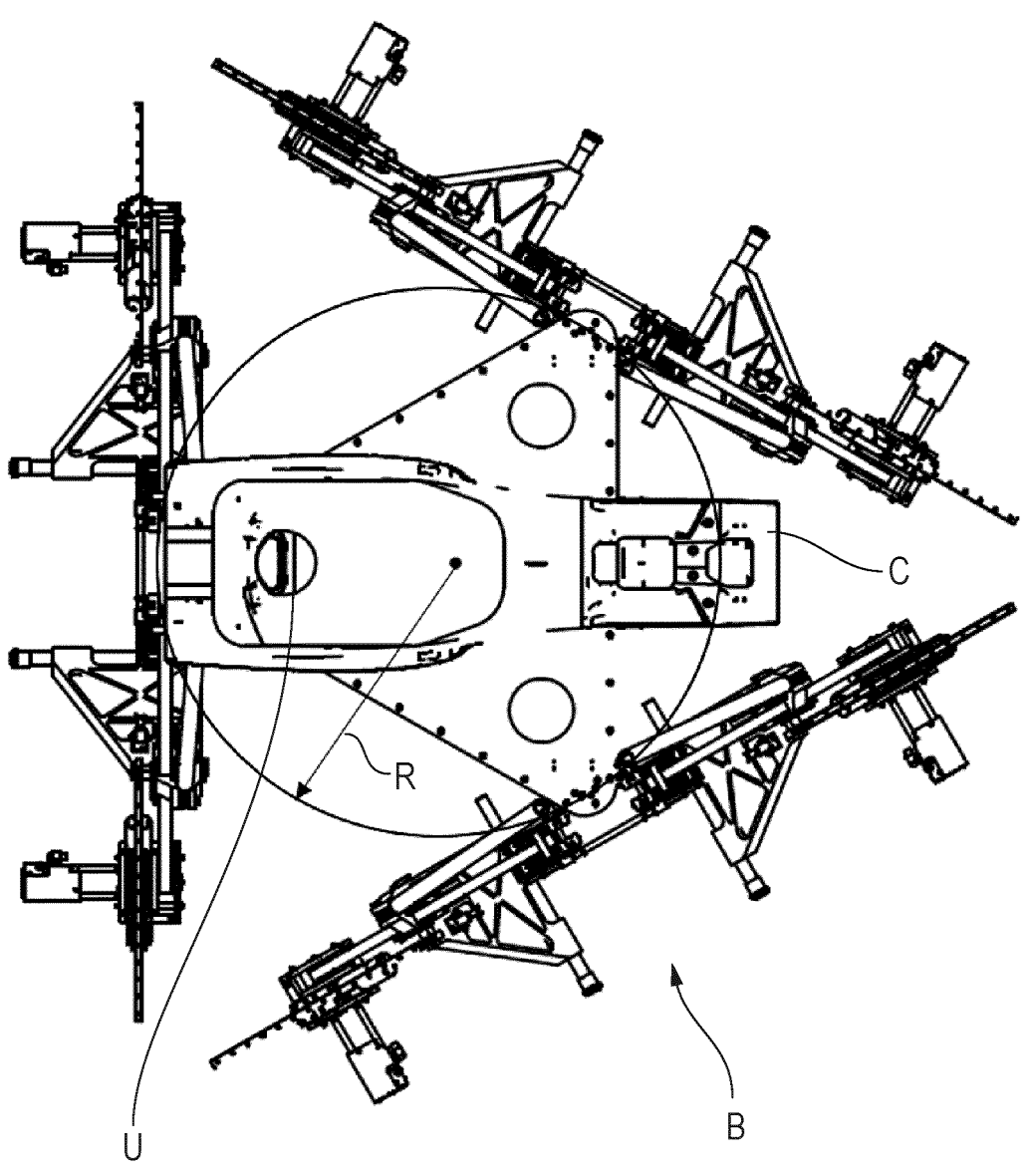
FIG. 8 is a plan view of a motion generator in accordance with the invention with horizontal pivot axes and supporting a chassis payload, used in the modelling experiments represented in FIGS. 5 and 6.

A motion generator 10 in accordance with a first aspect of the invention, and elements thereof, are shown in FIGS. 1 to 3A. The motion generator 10, which has an end effector constituted by platform 13, is mounted on a surface 14. The platform 13, constitutes the payload of the motion generator 10 in this embodiment. Further, or alternative, payloads may be involved. For example, the payload may comprise a chassis in the form of a replica of a racing car cockpit (for example as shown in FIGS. 7 and 8). The motion generator 10 has a generally triangular shape and is constructed of a lightweight rigid material such as aluminium. The motion generator 10 is mounted directly on the surface 14. Alternatively, the motion generator 10 may be mounted on or within a frame, such as a space frame. The use of a frame has the advantage that it can be used to carry the entire motion generator, particularly when the motion generator is used as a secondary motion generator in series with a primary motion generator. The platform 13 is supported by pairs of elongate rigid rods or struts S1, S2; S3, S4; and S5, S6 which at their upper ends are connected by upper joints UJ1, UJ2, UJ3, UJ4, UJ5, and UJ6 respectively to the platform 13. The terms "rods" and "struts" are used interchangeably in this specification. The elongate rigid struts S1-6 may be made, for example, of a stiff, light material such as steel, aluminium, or a composite material such as carbon fibre. The upper joints UJ1-UJ6 are spherical joints in this embodiment but may comprise, for example, Cardan, or other universal joints, pivoting bearings, or swivels, and/or may comprise flexures. The lower end of each elongate struts S1-S6 is connected by a lower joint LJ1, LJ2, LJ3, LJ4, LJ5, and LJ6 respectively to an associated rocker R1, R2, R3, R4, R5, and R6, respectively which are arranged for pivotal movement about a horizontal (with respect to the surface 14) pivot axis. The horizontal rocker pivot axes RPA3 and RPA6 of rockers R3 and R6 respectively are shown by way of example in FIG. 2A. The lower joints LJ1-LJ6 may also comprise spherical, Cardan, or other universal joints, pivoting bearings, or swivels, and/or may comprise flexures. Cardan joints are preferred for the lower and/or upper joints. More particularly, offsetting the two axes of rotation of the Cardan joint is particularly preferred as this arrangement permits the joint to be stiffer in axial motion compared to conventional Cardan joints where the axes of rotation intersect. Actuators in the form of toothed belt drives BD1-6, which are driven by associated electric motors EM1-6, are connected to the rockers R1-6. Each of the belt drives BD1-6 also connects to a tensioning device in the form of belt tensioners T1-6 respectively which provide a preload tension on the connected associated rocker against the belt drive connected to that rocker. The belt tensioners T1-6 each comprises a pulley around which the associated belt passes and a means of providing a force to the pulley such as a spring on a linear guide, or a torsion spring acting around the pivot of a lever arm to which the pulley is mounted on the end of the arm. The force provided by the belt tensioners T1-6 maintains a tension in the belt to accommodate for changes in geometry over the associated rocker travel. Housings H1-3 are arranged about rocker pairs R1,2; R3,4; and R5,4 and associated belt drives BD1-6. The connection between the rockers R1-R6 and the associated belt drives BD1-6 and electric motors EM1-6 is shown in more detail in FIGS. 2, 2A, and 3 in which the housings H1-3 are not shown.

Figure 3:
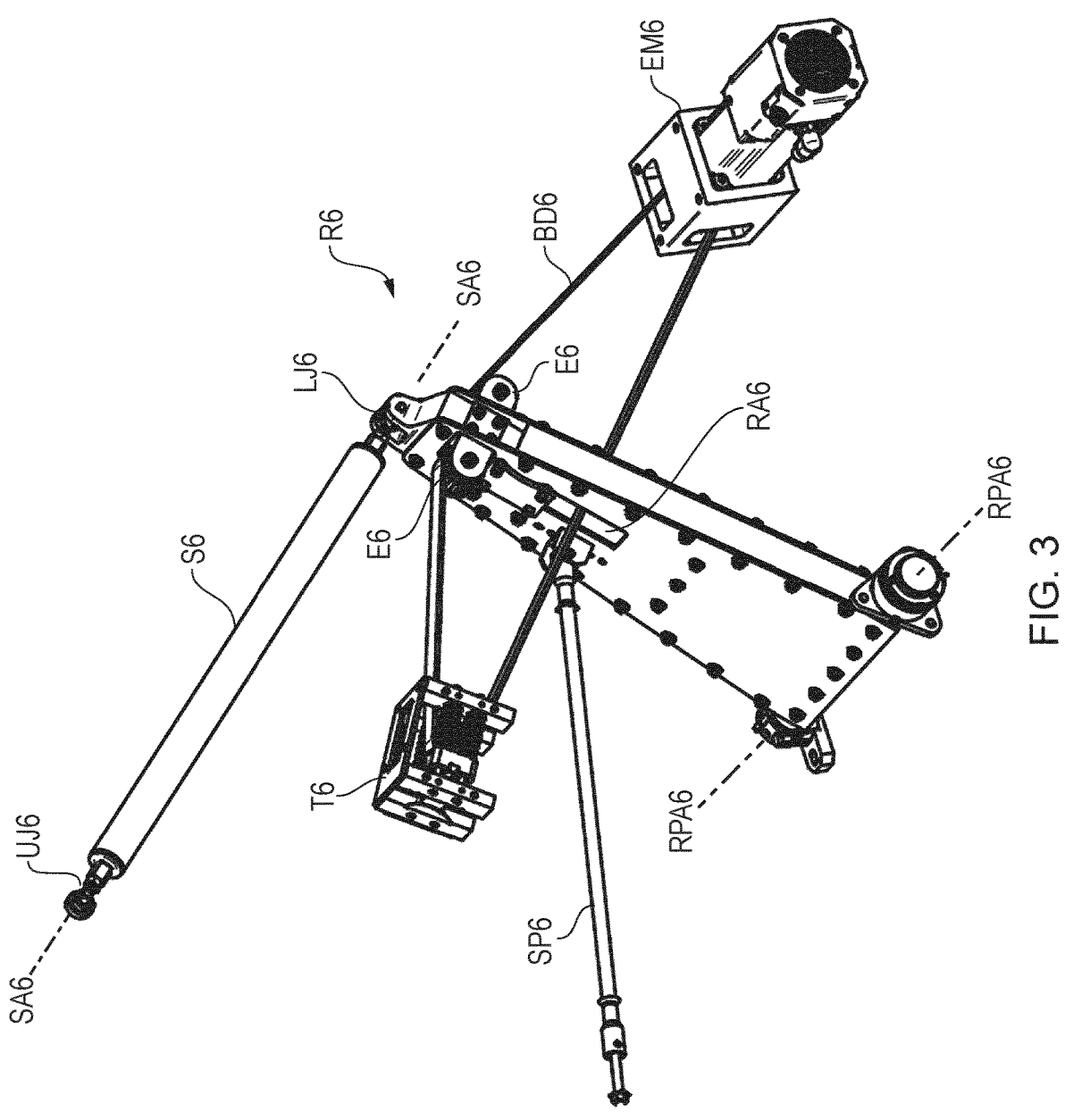
FIG. 3 is a schematic perspective view of a rocker and actuator arrangement for use in a motion generator in accordance with the invention.

FIG. 3 shows a rocker (e.g., R6) and connected elements in more detail as an example of a rocker and associated actuator arrangement and are described in more detail below. The other rockers R1-5, and associated elements of the motion generator are correspondingly constructed and arranged. The rocker R6 is arranged to pivot about rocker pivot axis RPA6 which is parallel with the surface 14 and constitutes a low friction guide in the arrangement. In the embodiment shown, the rocker pivots comprise bearings at either end of a pivot shaft, but these could be replaced by, for example, flexures. The rocker R6 is supported by a tension spring SP6, which is anchored at its other end to the motion generator structure. The spring SP6 constitutes a passive force device which provides assistance to the actuator by providing a restoring force to support the payload/end effector weight at or near to a neutral (or "nominal") position in its range of travel. Such a passive force device could be provided by a bungee, tension spring, gas strut attached to a point on the rocker arm pulling in a direction which reacts the weight of the payload. An elongate strut S6 is hingedly connected at its lower end to the outer end of the rocker arm by a lower joint LJ6 and at its upper end by UJ6 (which connects to the end effector). The elongate strut S6 defines a central longitudinal axis SA6. Either ends of an elongate toothed belt BD6 connect with the rocker R6 via rounded elements E6 which reduce wear on the connected belt BD6. The elements E6 may be curved or circular, for example in the form of pulleys, and may be toothed to engage with the toothed belt. An example of a suitable toothed belt is a Conti® Synchrochain Carbon belt made by Continental. A principal length of belt BD6 passes through an aperture RA6 defined by the rocker arm of rocker R6 which avoids unwanted contact between elements during motion generator operation.

Although in this embodiment, either ends of an elongate belt are fixed to an associated rocker, it is contemplated that, as noted above, an entirely closed loop belt or similar drive may be used in a motion generator of the invention, the closed loop belt being suitably fixed to the rocker.

The toothed belt BD6 passes around a drivable correspondingly toothed electrically powered capstan C6 (obscured) of electric motor EM6. A suitable example of an electrically powered capstan would be a synchronous belt sprocket by Martin, driven by an AKM2G Servo Motor by Kollmorgen. Capstan C6/motor EM6 operates under the control of a control system (for example, as described in relation to FIG. 4). It will be noted that the motor EM6 is connected by a relatively short length of the belt BD6 to the rocker R6 which effectively contributes to the responsiveness of the motion generator. It will be appreciated that the location of tensioner and motor/capstan are interchangeable. The motor could be mounted above the tensioner in some arrangements. This may be advantageous in shortening the length of the belt, potentially reducing any stretching of the belt and so enabling high bandwidth, low latency operation.

It will be noted that the belt BD6 and associated rocker R6 are arranged to move parallel with the longitudinal axis SA6 of the associated strut S6. In this way, advantageously, less bending load is taken by the rocker R6, and the load is more directly transmitted to the belt BD6 and therefore the motor EM6. This arrangement provides an advantageously more direct line of action of force from the motor EM6 to strut S6. In other words, there is a stiffer load path from motor EM6 to belt BD6 to strut S6 that takes out the reaction force required to be provided by the rocker R6. This means that the rocker R6 is not required to provide a reaction force in bending (at least when the system is on centre) and therefore the movement of the rocker R6 is improved compared with other motion generator designs.

Figure 3A:
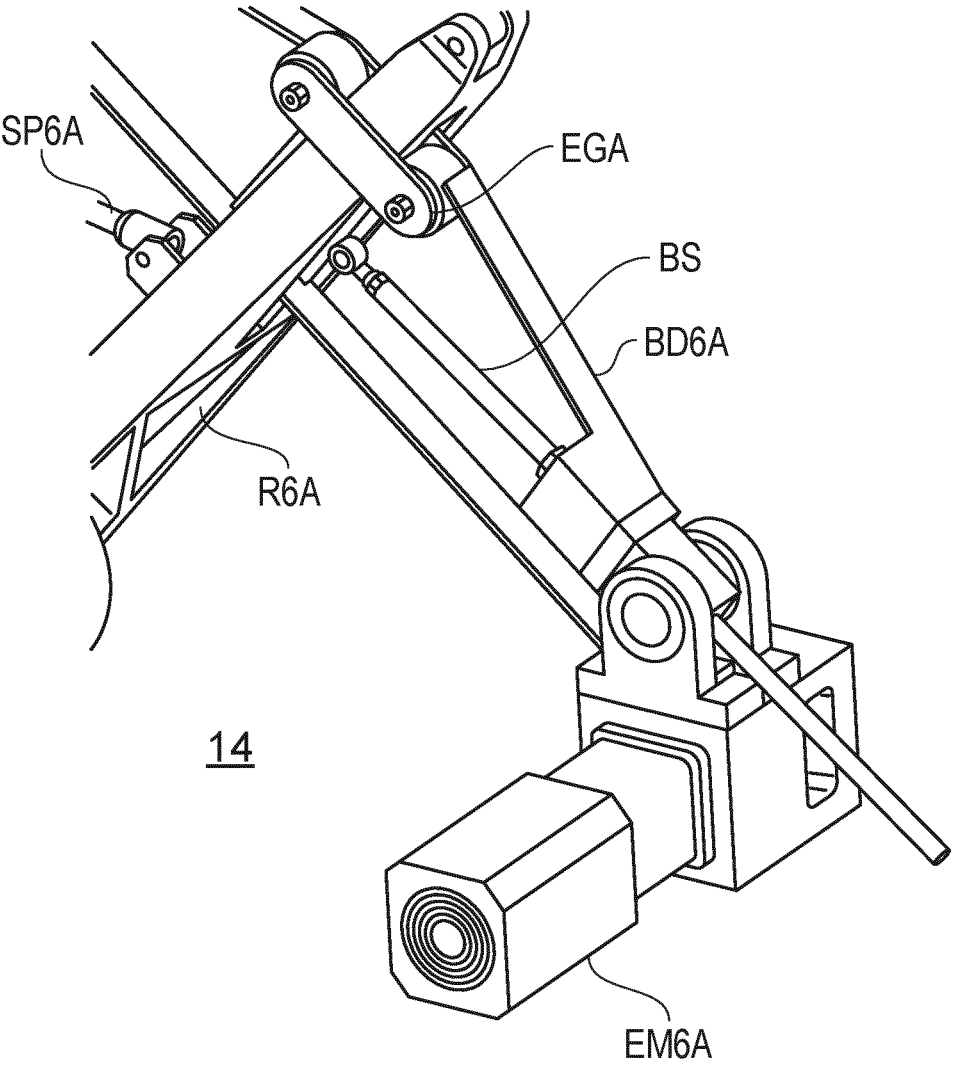
FIG. 3A is a schematic perspective view of an alternative rocker and actuator arrangement for use in a motion generator in accordance with the invention.

FIG. 3A shows an alternative, but generally similar, rocker R6A and actuator arrangement to that described above in relation to FIG. 3, and corresponding references have been used in relation to the corresponding components. An optional additional braking system BS is connected to the rocker R6A to control deceleration of the rocker.

By movement of one or more of the rockers R1-R6 (or the rockers in other embodiments described above) driven by the associated belts BD1-6 and capstans C1-6 under the control of the control system, the struts S1-6 move the effector 13, at high bandwidth in any of six degrees of freedom into a wide variety of conditions, some of which are described below.

Furthermore, the motion generator 10 has excellent lateral, longitudinal, and vertical excursion capabilities for its footprint, for example, as defined in terms of its chassis arm radius as discussed below, compared to other motion generator designs of a similar footprint.

Figure 4:
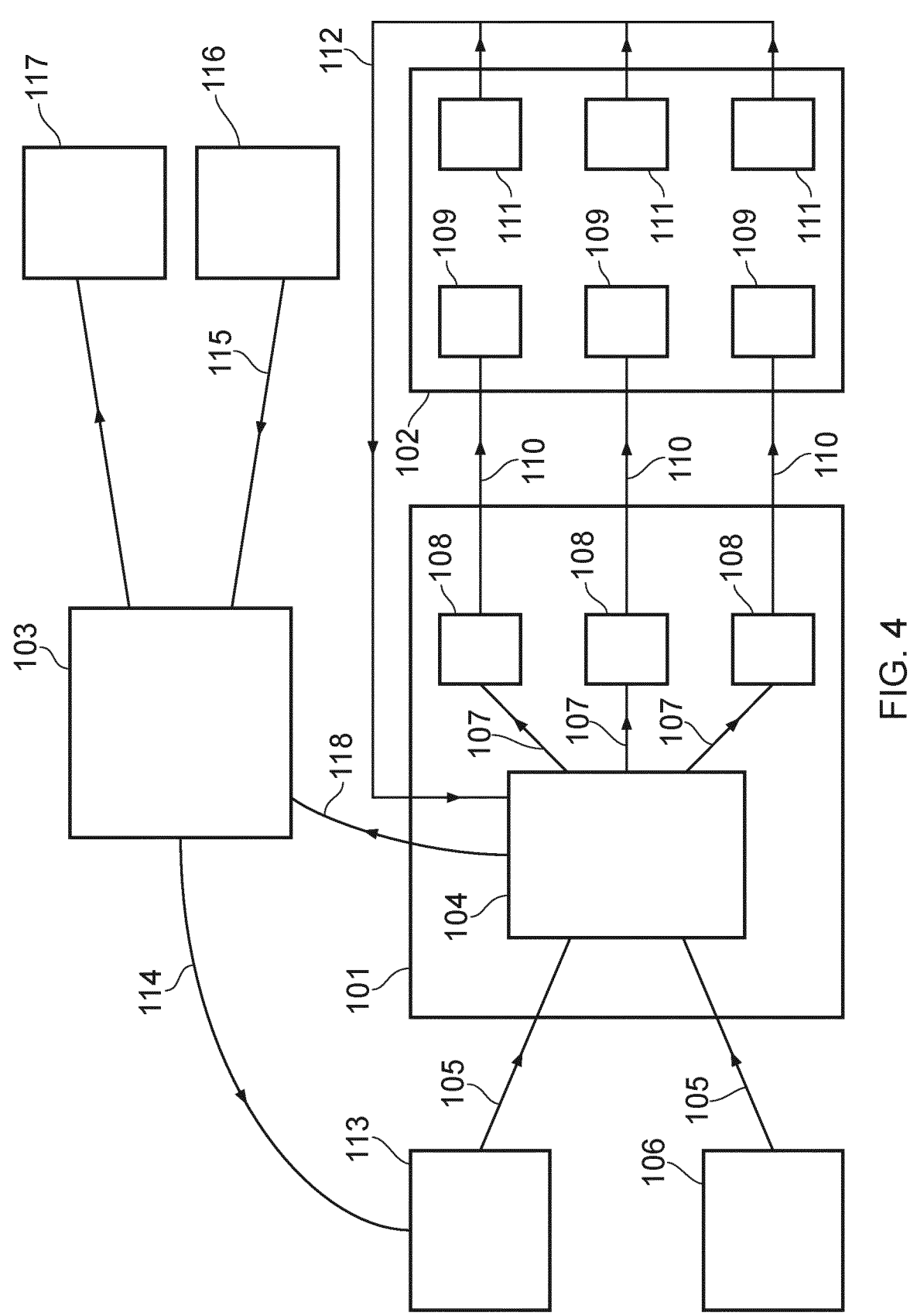
FIG. 4 is a schematic view of a control system for use with motion generators in accordance with the invention.

The motion generator 10 can be operated under the control of a control system as shown in FIG. 4 and numbered as 100. The motion generator and a control system together constitute a motion system. In relation to FIG. 4, the motion generator is referred to with the reference numeral 102, but the control system 101 is applicable to the other motion generators, motion systems, and motion simulators described herein. The control system 101 comprises a motion controller 104 which executes a computer program, preferably in a deterministic or real time manner, and which takes motion demand inputs 105 from a demand generator such as a simulation environment 103 or a set point generator 106. The motion controller computes the positions, accelerations and/or forces 107 required to be produced at each actuator 109 in order to generate the demanded motion profile 105. The control system 101 also comprises servo drives 108 which provide precisely controlled electrical currents 110 to drive the actuators 109 (e.g., electric motors EM1-6; and associated capstans C1-6 and belts BD1-6 in the example embodiment above).

In operation, the motion controller sends to each servo drive 108 a demanded position or force 107. The actuator 109 has a motion measurement device 111, such as an encoder, which provides motion feedback 112 to the motion controller, optionally via the servo drive. The motion controller compares the demanded motion profile 105 to the one measured 112 and updates the actuator demand 107 accordingly.

FIG. 4 also shows the control system 101 with a simulation environment 103, such as a driving simulation in which the physics of a simulated vehicle and its environment, such as a racetrack or city roads, are computed. For example, the driving simulation may be in the context of a driving simulator in accordance with the invention as described below. In this embodiment the control system 101 receives motion demands from the simulation environment 103, which represent the motion of a virtual vehicle. The computer program determines the motion of the vehicle in a virtual world 114, then applies a motion cueing algorithm 113 (MCA, also known as washout filters) to transform the simulated vehicle motions into those that can be represented by the motion generator. These calculated motions are then provided to the control system as motion demands 105. The MCA 113 could be part of the simulation environment 103 or the control system 101 or separate to both. The simulation environment 103 may receive inputs signals 115 from control devices 116 such as steering, throttle or brake inputs, which an operator, i.e., a human user such as a driver, passenger or pilot uses to control the virtual vehicle in the simulation environment. The operator would likely be a passenger (driver) in a chassis as payload on the motion generator 102 (e.g., motion generator 10 in the example embodiment). These inputs 115 may be passed back to the simulation environment via the control system or directly. The simulation environment is also likely to produce an output on a visual display 117 for the driver, passenger, or other user or operator. The simulation environment may also require additional data 118 from the control system, such as relating to the position of the motion generator, or control device inputs signals.

Operation of a Motion Generator

Figure 1:
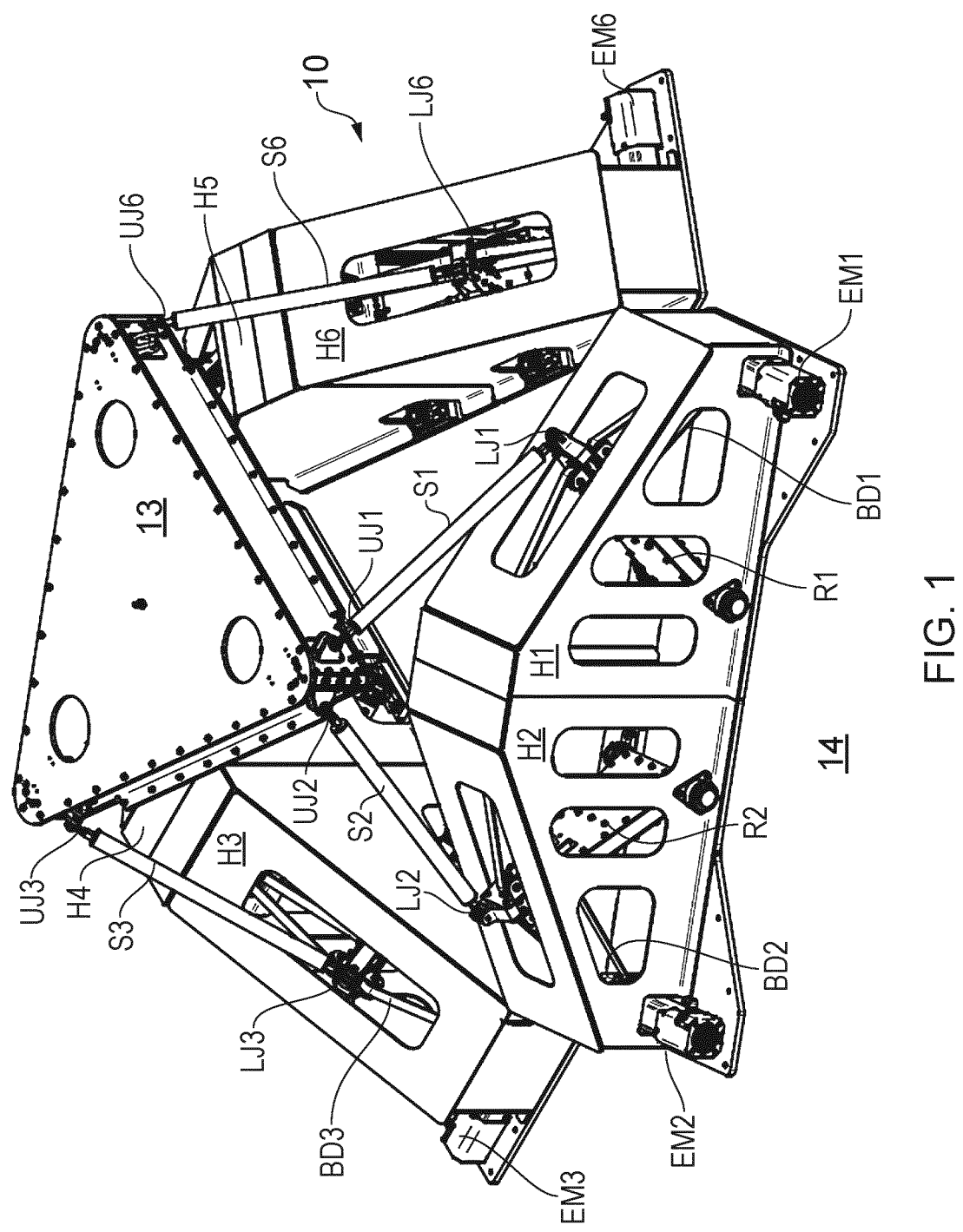
FIG. 1 is a schematic perspective view of a motion generator in accordance with the invention, from above and one side.
Figure 2:
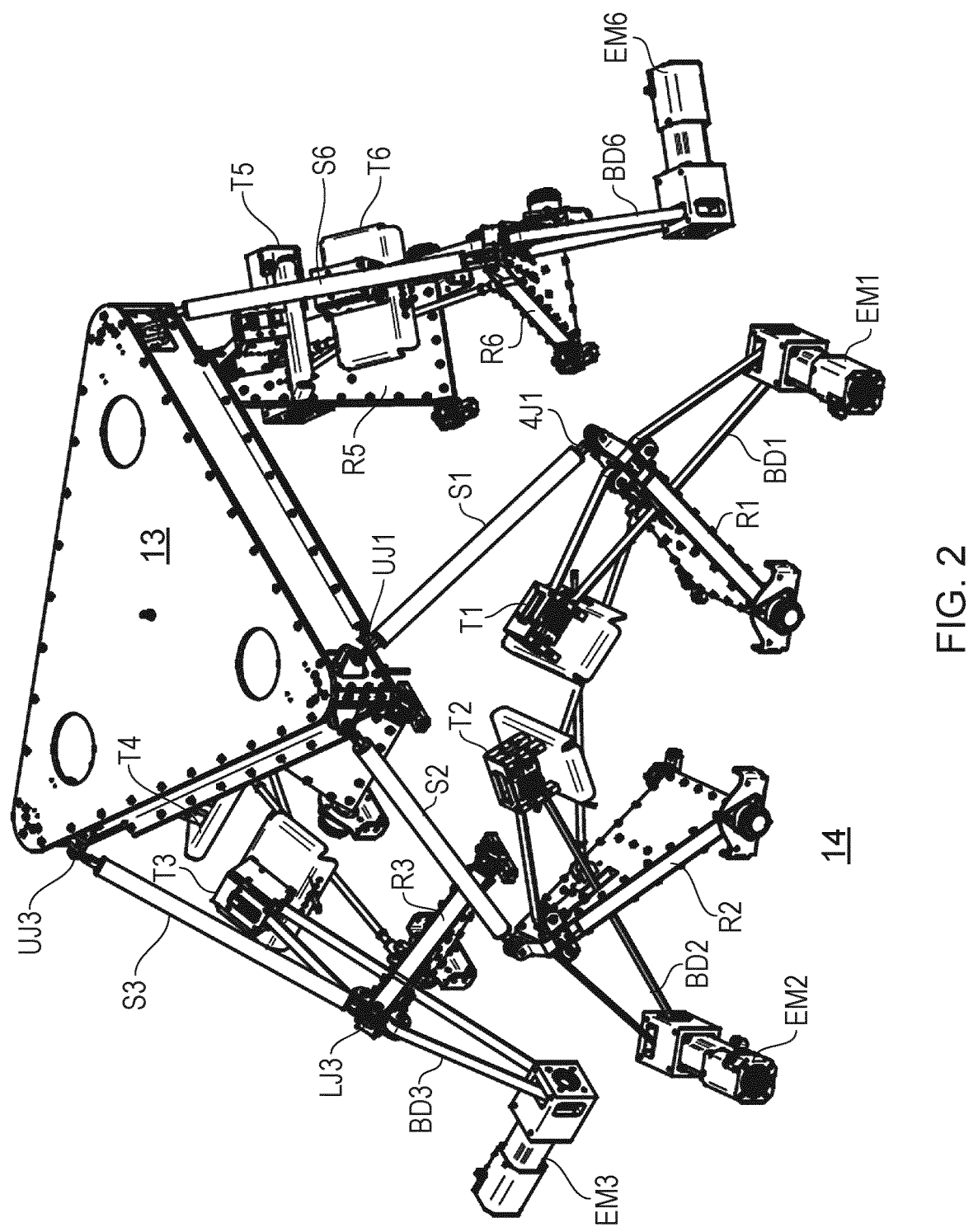
FIG. 2 is a further schematic perspective view of the motion generator of FIG. 1, from above and the same side with some external components removed for clarity.
Figure 2A:
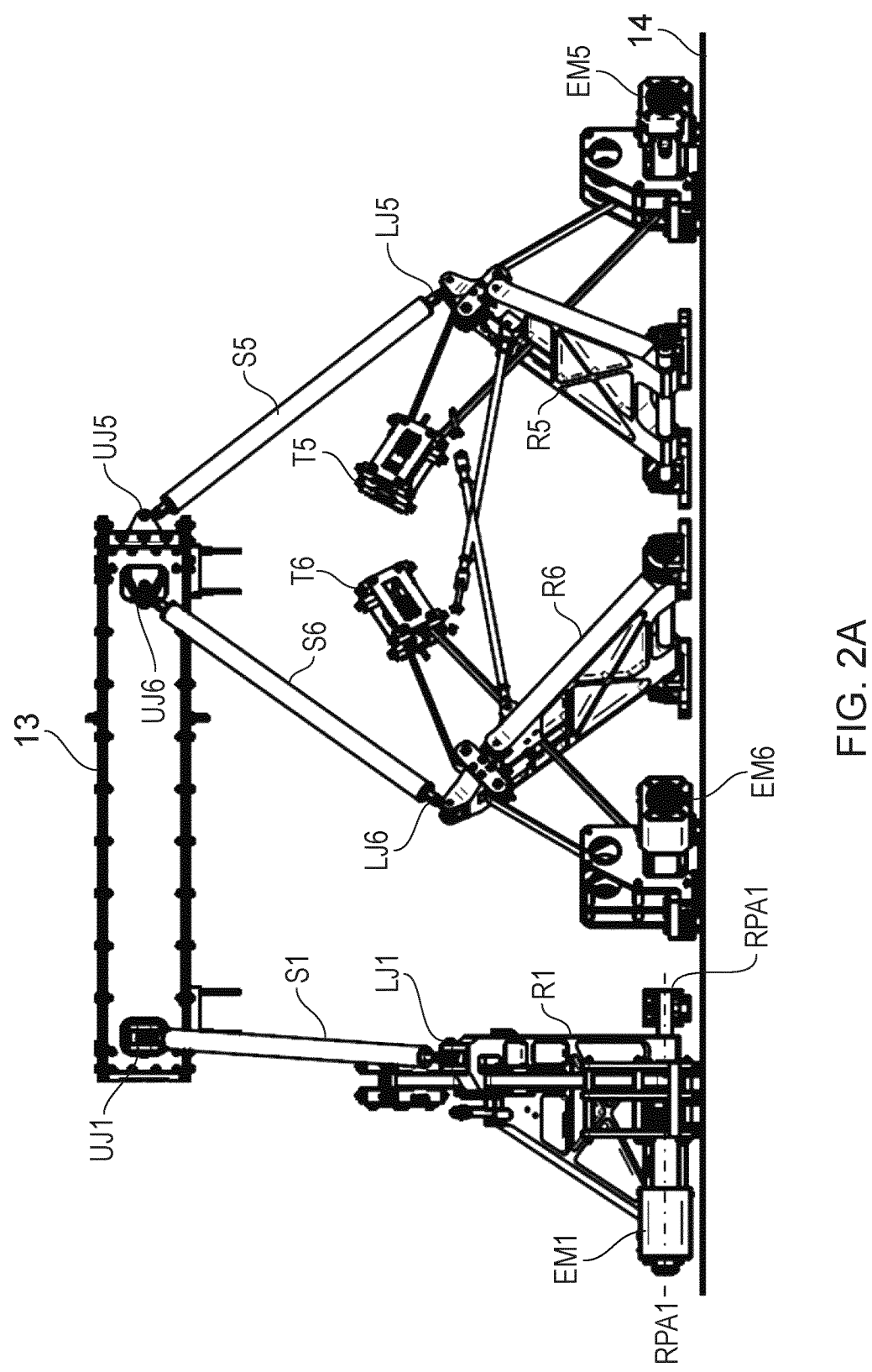
FIG. 2A an elevation from the same side of the motion generator as shown in FIG. 2 with some external components also removed for clarity.

The motion generator 10 is shown with the platform in a neutral (or "nominal") condition in FIGS. 1, 2, and 2A i.e., the motion generator is in a neutral or nominal condition. The motion generator can be operated to move the end effector into various other conditions. It will be appreciated by the skilled addressee that the motion generator 10 may be operated into many conditions including, and not exclusively, surge rearward, sway right, heave down, roll left side down, pitch nose up and yaw nose right. Furthermore, it will also be appreciated by the skilled addressee that the motion generator 10 may be operated into multiple combinations of such conditions. For example, the motion generator may be operated into a combined heave up and yaw nose left condition. The motion generator has the advantages of the invention including high bandwidth, low friction, and/or low inertia which increase the accuracy of the movements of the payload/end effector 13.

Figure 5:
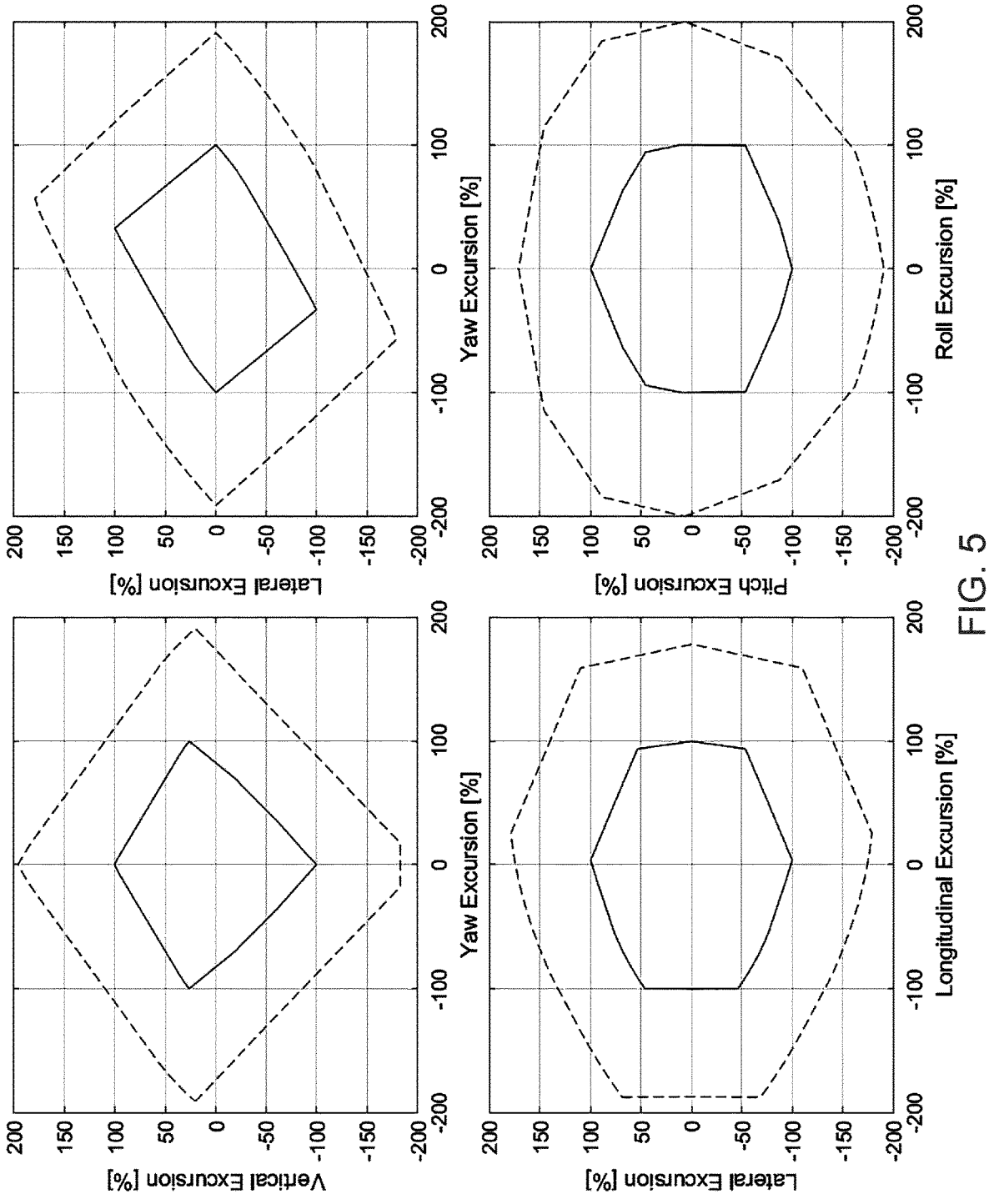
FIG. 5 illustrates the results of modelling experiments on the excursion in different degrees of freedom of the effector of a motion generator in accordance with the invention and a comparable motion generator (shown in FIG. 7)
Figure 6:
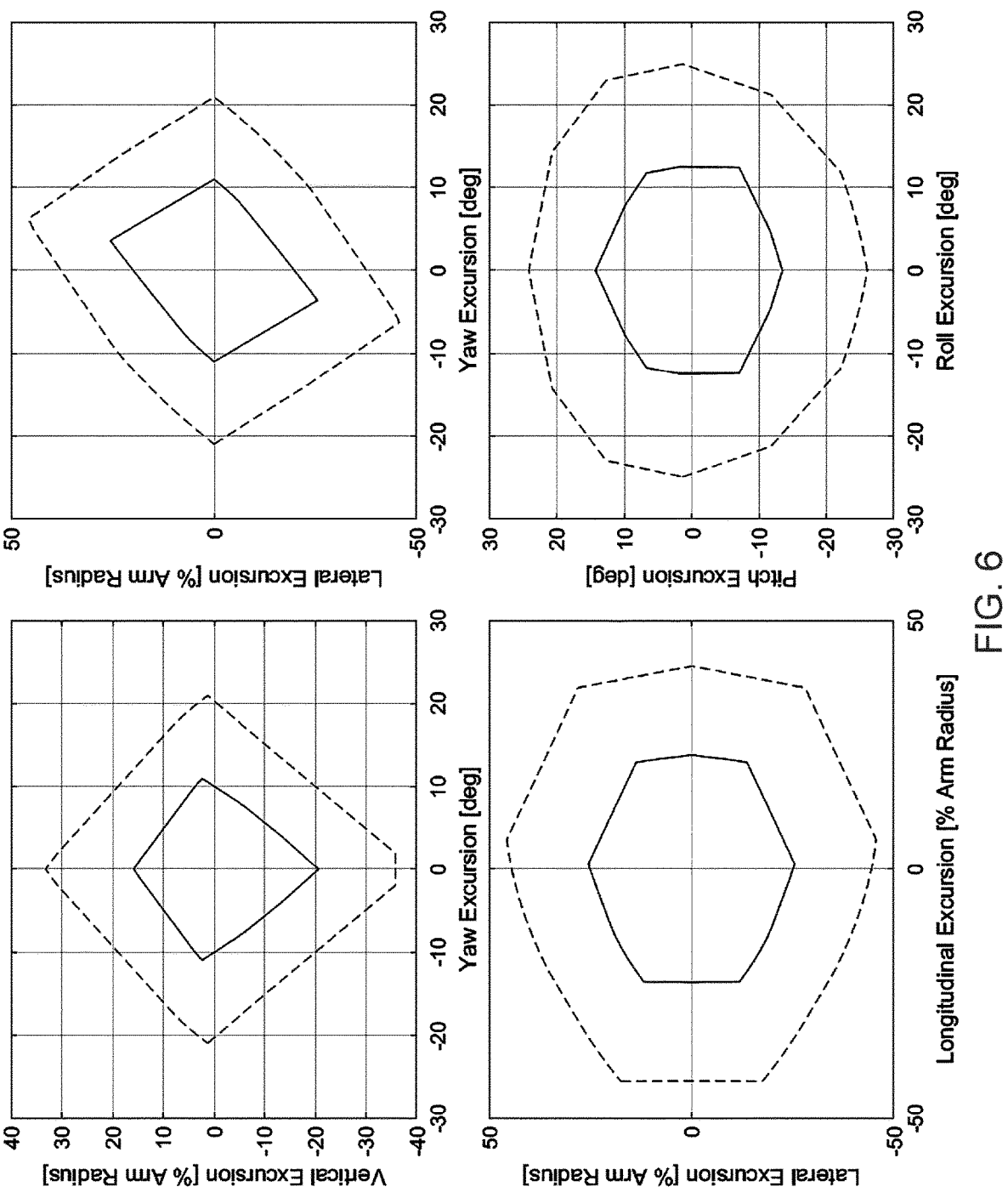
FIG. 6 illustrates the results of further modelling experiments on the excursion in different degrees of freedom of the effector of a motion generator in accordance with the invention and a comparable motion generator.

Comparison of Motion Generator in Accordance with the Invention and a Comparable Motion Generator The results depicted in FIGS. 5 and 6 are a comparison of excursion envelopes between a comparable baseline motion generator, configuration A, according to a preferred embodiment of WO2020/228992 (EP37395580) with six rockers having arms moving in the horizontal plane (i.e. with vertical pivot axes and shown in plan view in FIG. 7) connected to struts supporting an end effector (results represented by solid lines), and a motion generator in accordance with the invention, configuration B, such as motion generator 10 described above, with six rockers moving in the vertical plane about horizontal rocker axes and supporting an end effector (results represented by dashed lines). The motion generator in accordance with the invention is shown in plan view in FIG. 8. It will be noted that a chassis C in the form of a racing car cockpit is mounted on the end effector of motion generator platforms, and a user U is shown in both cockpits. Both motion generator configurations A and B have the same "chassis arm radius" The "chassis arm radius" being the distance from the centre of the end effector/to the upper joints connecting the struts to the end effector, shown as R in FIGS. 7 and 8), and can be said to have a comparable footprint.

In this study, a simulation was performed in which the rockers of the two motion generator configurations were swept through their complete possible range, with all combinations of rocker positions covered across the six rockers. During the simulation, the resulting end effector displacement was measured in each of the six degrees of freedom. Each excursion envelope is a visualisation of the maximum positions achievable by the end effector in cross sections of different combinations of the various degrees of freedom.

It can be seen from FIG. 5 which shows the increase in excursions in different degrees of freedom of the motion generator of the invention, configuration B (represented by the dashed lines) as a percentage of the excursion in different degrees of freedom of the comparable motion generator, configuration A (represented by the solid lines) that the excursion envelope of the motion generator of the invention provides a significant improvement in vertical and horizontal excursion compared with the baseline motion generator, configuration A, since the excursions are significantly larger in all such degrees of freedom. The ratio of increase is therefore between 60% larger and 100% larger for the motion generator configuration of the invention compared to the comparable motion generator configuration. For both motion generator configurations, the excursions are usable, since the resulting envelopes of excursion of the end effector are approximately circular and convex, meaning that it is possible to move in a straight line from any one point in the envelope, to another point, without hitting a geometric limit i.e., the movement of the end effector is uninhibited throughout the range of movement. FIG. 6 shows the translational excursion as a percentage of the chassis arm radius. For example, 50% of a chassis arm radius which is 800 mm results in 400 mm excursion. However, as shown particularly in FIG. 6, the motion generator of the invention has particular improvements to the usable longitudinal and lateral excursion envelope and also to the roll vs pitch envelope, since these are larger and more uniformly circular than in the baseline motion generator configuration. In terms of motion ratios, the motion generator of WO2020/228992 has a typical motion ratio between the rockers and vertical degree of freedom of about 0.17 to about 0.52. In contrast, across the same range of vertical travel the motion generator of the present invention has a motion ratio of about 0.38 to about 0.45.

Combination of Motion Generators

Figure 9:
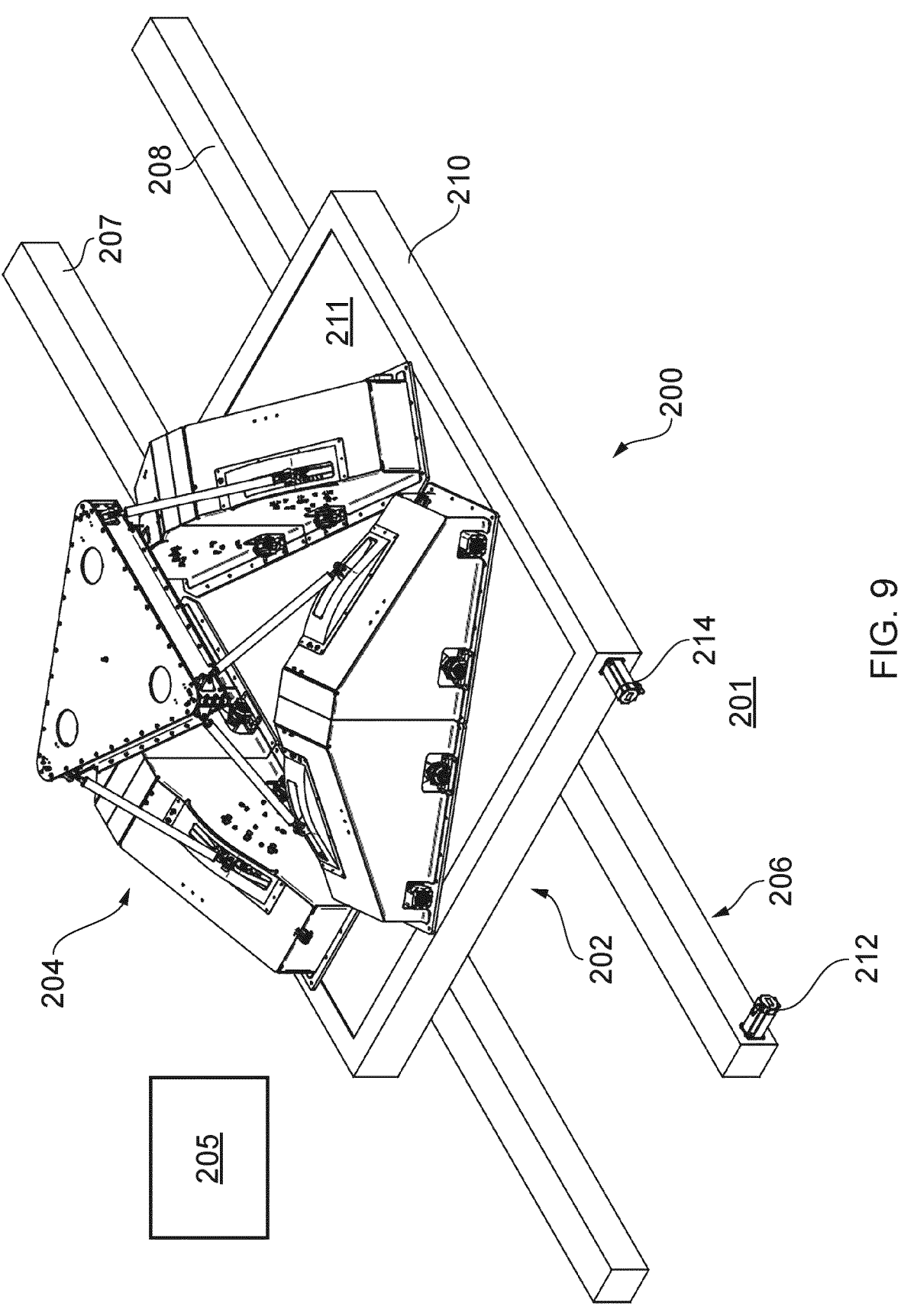
FIG. 9 is a schematic view of a combination including a motion generator in accordance with the invention, and another motion generator.

A motion generator in accordance with the invention may be used in series with a further motion generator i.e., as first and second motion generator stages. For example, a motion generator in accordance with the invention may be used as a secondary motion generator, that is to say the motion generator itself becomes the payload of a primary motion generator. FIG. 9 shows a combination 200, which is in accordance with the invention, and comprising a first (or "primary") motion generator 202, and a second (or "secondary") motion generator 204 (which is a motion generator in accordance with the invention and generally as described above in relation to FIGS. 1-3). The combination 200 is installed on a planar surface 201 (not shown) typically a building floor. The primary motion generator 202 is a simple X and Y frame arrangement, comprising a lower frame 206, including lower frame members 207, 208, and an upper frame 210. The lower frame member 208 supports a motor 212 which can be operated, under commands from a control system 205 (for example as shown in FIG. 4) to move the frame 210 in the X direction. A similar motor 214 is correspondingly arranged on the frame 210 to move that frame in the Y direction under commands from the control system 205. The secondary motion generator 204, which is a motion generator in accordance with the first aspect of the invention mounted on the primary motion generator 202, comprises rocker (directly mounted on upper frame element 211 of the primary motion generator i.e., it is mounted in a plane above the surface 201) which is drivably connected to an actuator (comprising a motor, and elongate belt which is attached to the movable end of the rocker, which passes around capstans all obscured by housings), and to an elongate rigid strut. The elongate strut is connected by a lower joint at one end to the free end of the associated rocker and at its other end by an upper joint to an end effector/payload 219. When the motor 217 is operated under commands from the control system, it drives a driven capstan and in turn the belt to move the associated rocker. The rocker pivots about a horizontal pivot axis, with the rocker arm describing a vertical arc. The movement of rocker moves the associated strut to move the end effector/payload 219 in the X and Y directions, as well permitting yaw, heave, and pitch motions. The combination 200 is advantageous in that the primary motion generator 202 is relatively inexpensive but provides good excursion ranges in the X and Y directions and the secondary motion generator 204 provides a higher bandwidth and lower levels of inertia and friction which increase the accuracy of the movements imparted to the payload. Whilst a combination in which the primary motion generator is a simple X and Y frame arrangement, more complex primary motion generators which give X, Y excursion and also infinite yaw capability (i.e., rotation about the Z axis) for example as generally described in WO2020/249262 could also be used in a combination.

Driving Simulator

Figure 10:
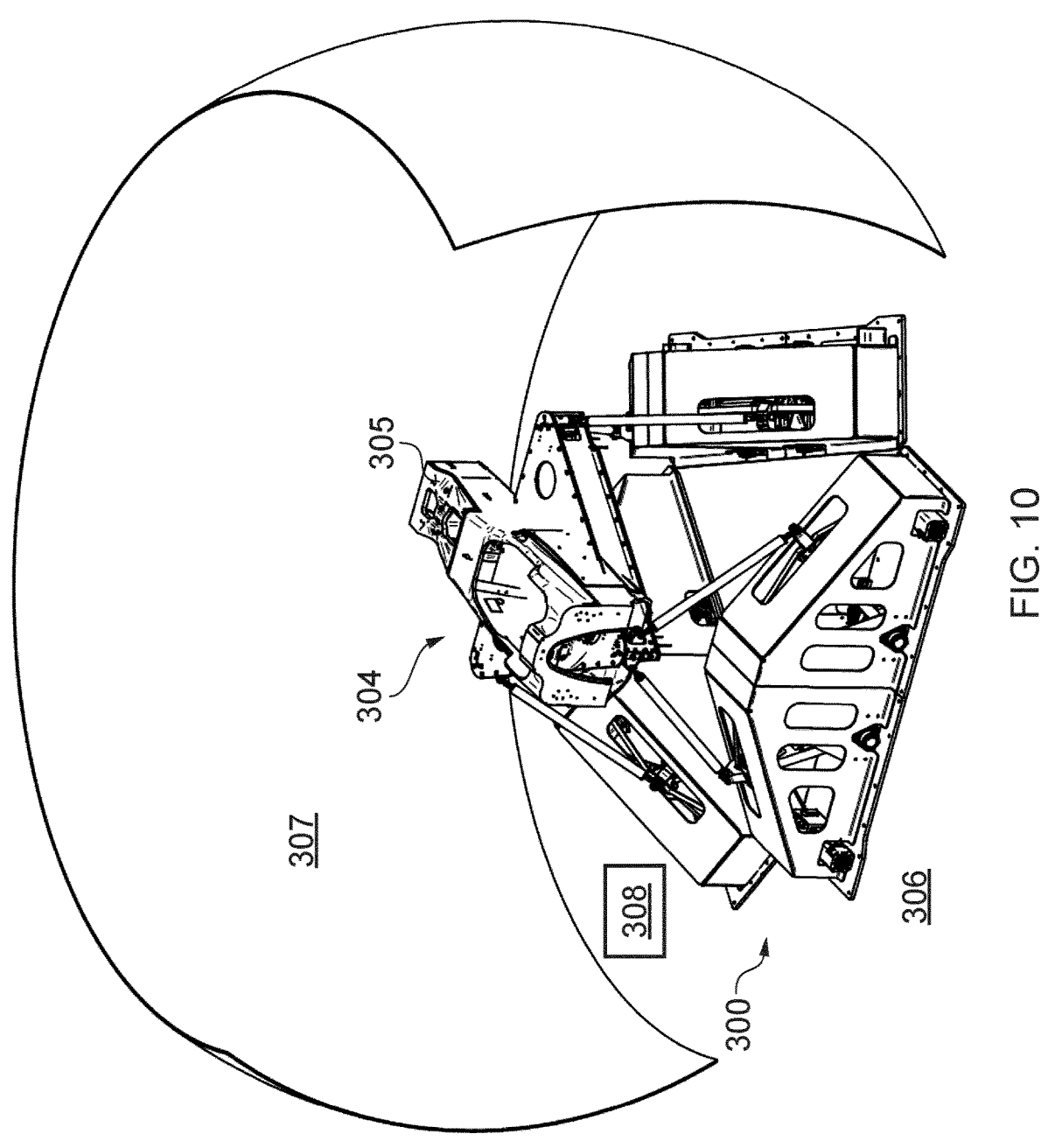
FIG. 10 is a perspective view of a driving simulator in accordance with the invention.

A driving simulator 300 in accordance with the invention is shown in FIG. 10. The driving simulator 300 comprises a motion system including a motion generator 304 in accordance with the invention, for example as described above in relation to FIGS. 1 to 4, or a combination including a motion generator of the invention as described above. The motion generator has a chassis 305 as effector payload. The motion system 302 is mounted on a surface 306 in front of a projection system 307 on which can be displayed images of a driving environment (the projection system constituting an example of an environment simulation means). An audio system (not shown) provides sound to the user replicating the sounds of a driving environment, constituting another example of an environment simulation means. The motion generator 304 of the driving simulator 300 is operated under the command of a control system 308 (for example, as described above in relation to FIG. 4).

A motion generator in accordance with the invention, used in a driving simulator as described in this embodiment may be advantageous in some or all of several respects compared with known motion generators for such applications. Of particular note, is the high level of excursion in the horizontal and vertical dimensions for a motion generator of such a compact footprint as represented by the results shown in FIGS. 6 and 7. Furthermore, it may have low levels of friction within its moving parts owing to a) the use of revolute joints or rotary bearings rather than linear bearings for reacting weight and inertial loads b) dispensing with recirculating ball screw linear actuators. Additionally, it may have low inertia particularly where rotary motors are used. Also, it may have high bandwidth typically better than 50 Hz, in more than one degree of freedom. In some embodiments it may have significantly higher bandwidth than 50 Hz, for example 80, 90, 100 or more Hz. These characteristics mean that as mentioned above the driving simulator has low latency (less than or equal to 3-4 ms), avoiding or minimising the need for latency correction needed in other driving simulators especially significantly more expensive driving simulators.

Methods of Producing Motion Systems

A motion system in accordance with the invention including a motion generator, such as those described above, and control means may be assembled from custom and standard components, for example as described above, by conventional means. In particular, a motion system may be produced by connecting a motion generator in accordance with the invention with a control system as described above in relation to FIG. 4.

The invention claimed is:

1. A motion generator for applying forces, moments and movements to an effector of the motion generator and/or effector payload, the effector being arranged relative to a surface, the effector being connected to a plurality of elongate rigid struts, each elongate rigid strut being connected at one end thereof by a first joint to the effector and being connected at its other end by a second joint to an associated rocker, the rocker having a pivot axis which is generally parallel with the surface, such that the movement of the rocker through a generally vertical arc about the pivot axis leads to movement of the effector, and forces applied to an associated rocker lead to forces being applied to the effector, in which the movement of a rocker and forces applied by the rocker are controlled by an actuator, the actuator being in the form of, or comprising, an elongate belt, cable, or rope drive which is connected by either end thereof to an associated rocker to apply a force to a point on the associated rocker away from the pivot axis of the rocker, the motion generator further comprising tensioning means for tensioning the elongate belt, cable, or rope drive during movement of an associated rocker.

2. A motion generator according to claim 1, in which the pivot axis of each rocker is one or both of parallel with the surface and horizontal.

3. A motion generator according to claim 1 in which one or both of the actuator and the rocker are arranged parallel with or in line with the longitudinal axis of the associated elongate rigid strut when the actuator and/or rocker are in a nominal condition.

4. A motion generator according to claim 3 in which one or both of the actuator and the rocker moves coaxially with the longitudinal axis of the associated elongate rigid strut.

5. A motion generator according to claim 4, in which an elongate portion of the actuator passes through an aperture defined by the associated rocker arm, or passes within the perimeter of the rocker arm, whereby the rocker arm and the elongate portion move in relation to each other during operation of the motion generator.

6. A motion generator according to claim 1 in which the maximum longitudinal excursion of the effector is one of: greater than 25% of the chassis arm radius, or greater than 40% of the chassis arm radius, or about 50% of the chassis arm radius.

7. A motion generator according to claim 1 in which the maximum lateral excursion of the effector is one of: greater than 25% of the chassis arm radius, or greater than 40% of the chassis arm radius, or about 50% of the length of chassis arm radius.

8. A motion generator according to claim 1 in which the maximum vertical excursion is one of: greater than 15% of the chassis arm radius, or greater than 30% of the chassis arm radius.

9. A motion generator according to claim 1 comprising four, or more elongate rigid struts.

10. A motion generator according to claim 9 in which there are six elongate struts which are arranged in three pairs, each of the struts being connected at one of their respective ends with an associated rocker, and the other respective ends of the paired struts connecting to three mounting points or joints of the effector.

11. A motion generator according to claim 1 in which each first and second joint together have a total number of degrees of freedom which is at least five.

12. A motion generator according to claim 1 in which one of the first or second joints includes a universal, cardan, or spherical joint, swivel, or flexure, while the other of the first or second joints is a universal, spherical, a cardan joint, or swivel or flexure in series with a revolute joint.

13. A motion generator according to claim 1, and in which the elongate belt, cable or rope drive is actuated by a capstan.

14. A motion generator according to claim 1 and including a passive force application device which acts on an associated rocker to react the weight of the payload/end effector to assist the associated actuator to support the payload/end effector in a nominal condition.

15. A motion generator according to claim 14 in which the passive force application device includes a bungee, tension spring, or gas strut which is connected to an associated rocker.

16. A motion generator according to claim 1 and having a motion ratio in the range of 0.3-0.5.

17. A motion generator according to claim 1 as a primary motion generator, in combination with a secondary motion generator, the primary motion generator and the secondary motion generator arranged to operate together, optionally in which the primary motion generator includes a frame and at least one of the rockers of the secondary motion generator is pivotally mounted to the frame of the primary motion generator with a horizontal pivot axis.

18. A motion generator according to claim 1, comprised in one of:
  a motion system including a control system; or
  a driving simulator including, at least one environment simulation means selected from visual projection or display means, and audio means; or
  a games machine comprising a control system arranged to control the motion generator, and a visual display for displaying a game scene.

19. A method of producing a motion generator according to claim 1, the method comprising providing an effector suitable for applying forces, moments and movements to a payload relative to a surface, connecting to four or more elongate rigid struts, connecting each strut at one end thereof by a first joint to the effector and at its other end by a second joint to a rocker, the rocker having a fixed horizontal pivot axis, such that movement of a rocker leads to movement of the effector, and forces applied to a rocker lead to forces being applied to the effector, and in which the movement of a rocker and forces applied by the rocker are controlled by an actuator, the actuator being arranged to apply a force to a point on a rocker away from the pivot axis of the rocker.

20. A motion generator for applying forces, moments and movements to an effector of the motion generator and/or effector payload, the effector being arranged relative to a surface, the effector being connected to a plurality of elongate rigid struts, each elongate rigid strut being connected at one end thereof by a first joint to the effector and being connected at its other end by a second joint to an associated rocker, the rocker having a pivot axis which is generally parallel with the surface, such that the movement of the rocker through a generally vertical arc about the pivot axis leads to movement of the effector, and forces applied to an associated rocker lead to forces being applied to the effector, in which the movement of a rocker and forces applied by the rocker are controlled by an actuator, the actuator being in the form of, or comprising, an elongate belt, cable, or rope drive which is connected by either end thereof to an associated rocker to apply a force to a point on the associated rocker away from the pivot axis of the rocker, the motion generator further comprising tensioning means for tensioning the elongate belt, cable, or rope drive during movement of an associated rocker, in which one or both of the actuator and the rocker are arranged parallel with or in line with the longitudinal axis of the associated elongate rigid strut when the actuator and/or rocker are in a nominal condition, and in which an elongate portion of the actuator passes through an aperture defined by the associated rocker arm, or passes within the perimeter of the rocker arm, whereby the rocker arm and the elongate portion move in relation to each other during operation of the motion generator.

\* \* \* \* \*